United States Patent
Pu et al.

(10) Patent No.: US 10,509,518 B2
(45) Date of Patent: Dec. 17, 2019

(54) TOUCH SUBSTRATE, MANUFACTURING METHOD THEREOF AND DISPLAY DEVICE

(71) Applicants: BOE Technology Group Co., Ltd., Beijing (CN); Hefei BOE Optoelectronics Technology Co., Ltd., Hefei (CN)

(72) Inventors: Xun Pu, Beijing (CN); Hongmin Li, Beijing (CN)

(73) Assignees: BOE Technology Group Co., Ltd., Beijing (CN); Hefei BOE Optoelectronics Technology Co., Ltd., Hefei (CN)

( * ) Notice: Subject to any disclaimer, the term of this patent is extended or adjusted under 35 U.S.C. 154(b) by 143 days.

(21) Appl. No.: 15/505,725

(22) PCT Filed: Jan. 15, 2016

(86) PCT No.: PCT/CN2016/071000
§ 371 (c)(1),
(2) Date: Feb. 22, 2017

(87) PCT Pub. No.: WO2017/031933
PCT Pub. Date: Mar. 2, 2017

(65) Prior Publication Data
US 2017/0277305 A1 Sep. 28, 2017

(30) Foreign Application Priority Data
Aug. 26, 2015 (CN) .......................... 2015 1 0531652

(51) Int. Cl.
*G06F 3/044* (2006.01)
*G02F 1/1333* (2006.01)
*G02F 1/1343* (2006.01)
*G06F 3/041* (2006.01)
*G09G 3/20* (2006.01)

(52) U.S. Cl.
CPC ............ *G06F 3/044* (2013.01); *G02F 1/1343* (2013.01); *G02F 1/13338* (2013.01);
(Continued)

(58) Field of Classification Search
CPC ................... G06F 3/044; G06F 3/0412; G06F 2203/04104; G06F 2203/04103;
(Continued)

(56) References Cited

U.S. PATENT DOCUMENTS 8,754,662 B1 * 6/2014 Weng ................. G01R 27/2605
324/686
2003/0028346 A1 2/2003 Sinclair et al.
(Continued)

FOREIGN PATENT DOCUMENTS

CN 102799332 A 11/2012
CN 102929458 A 2/2013
(Continued)

OTHER PUBLICATIONS

May 24, 2016—(WO) International Search Report and Written Opinion Appn PCT/CN2016/071000 with English Tran.
(Continued)

*Primary Examiner* — Ariel A Balaoing
(74) *Attorney, Agent, or Firm* — Banner & Witcoff, Ltd.

(57) ABSTRACT

A touch substrate, a manufacturing method thereof and a display device. The touch substrate, comprising a plurality of self-capacitive electrodes; a planar shape of each self-capacitive electrode on a surface provided with the plurality of self-capacitive electrodes includes a body section and a plurality of projections extending from a first side of the body section; the plurality of projections extend along a first direction and sequentially arranged along a second direction. On the surface provided with the plurality of self-capacitive electrodes, a recessed portion is encircled by every two
(Continued)

projections and the body portion of each self-capacitive electrode; and in the recessed portion is provided with one of a plurality of projections of another self-capacitive electrode. The touch substrate can reduce the number of leads while ensuring the touch accuracy.

20 Claims, 7 Drawing Sheets (52) U.S. Cl.
CPC ............. *G06F 3/0412* (2013.01); *G09G 3/20* (2013.01); *G06F 2203/04103* (2013.01); *G06F 2203/04104* (2013.01); *G09G 2300/023* (2013.01); *G09G 2300/0426* (2013.01)

(58) Field of Classification Search
CPC ............ G02F 1/1343; G09G 2300/023; G09G 2300/04104
See application file for complete search history.

(56) References Cited

U.S. PATENT DOCUMENTS

| | | | | |
|---|---|---|---|---|
| 2012/0105356 | A1* | 5/2012 | Brosnan | G06F 3/044 345/174 |
| 2012/0227259 | A1* | 9/2012 | Badaye | G06F 3/044 29/846 |
| 2013/0314342 | A1* | 11/2013 | Kim | G06F 3/041 345/173 |
| 2014/0192027 | A1* | 7/2014 | Ksondzyk | G01N 27/22 345/178 |
| 2015/0097801 | A1* | 4/2015 | Trend | G06F 3/046 345/174 |

FOREIGN PATENT DOCUMENTS

| | | |
|---|---|---|
| CN | 103345342 A | 10/2013 |
| CN | 103472613 A | 12/2013 |
| CN | 203643988 U | 6/2014 |
| CN | 104035639 A | 9/2014 |
| CN | 104169850 A | 11/2014 |
| CN | 104360774 A | 2/2015 |
| CN | 105159510 A | 12/2015 |
| WO | 2014105942 A1 | 7/2014 |

OTHER PUBLICATIONS

Aug. 15, 2017—(CN) First Office Action Appn 201510531652.2 with English Tran.

* cited by examiner

TOUCH SUBSTRATE, MANUFACTURING METHOD THEREOF AND DISPLAY DEVICE

The application is a U.S. National Phase Entry of International Application No. PCT/CN2016/071000 filed on Jan. 15, 2016, designating the United States of America and claiming priority to Chinese Patent Application No. 201510531652.2, filed Aug. 26, 2015. The present application claims priority to and the benefit of the above-identified applications and the above-identified applications are incorporated by reference herein in their entirety.

TECHNICAL FIELD

At least one embodiment of the present disclosure relates to a touch substrate, a manufacturing method thereof, and a display device.

BACKGROUND

With the rapid development of display technology, capacitive touch display devices have been widespread in people's lives. Currently, a capacitive touch display device detects a touch position by utilization of the mutual-capacitance or self-capacitive principle. Compared with the touch display device employing the mutual-capacitance principle, the touch display device employing the self-capacitive principle can effectively improve the signal-to-noise ratio (SNR) of touch and improve the accuracy of touch sensing, and hence receives wide attention.

Generally, the touch display device employing the self-capacitive principle comprises a plurality of self-capacitive electrodes which are arranged in the same layer and insulated from each other. When the screen is not touched by a touch object, the capacitance of the self-capacitive electrode is at a fixed value, and the time of charging the capacitor is also at a fixed value. When the screen is touched by the touch object, the capacitance of corresponding self-capacitive electrode changes and the time of charging the capacitor changes as well, so that a touch chip can determine the touch position by detecting the variation of the charging time of the self-capacitive electrode in the touch period.

SUMMARY

At least one embodiment of the present disclosure provides a touch substrate, a manufacturing method thereof and a display device, which can increase the dimension of self-capacitive electrodes while ensuring the touch accuracy, and hence reduce the number of wirings and the number of corresponding pins.

At least one embodiment of the present disclosure provides a touch substrate, comprising a plurality of self-capacitive electrodes arranged in a plurality of electrode rows and a plurality of electrode columns; a planar shape of each self-capacitive electrode on a surface provided with the plurality of self-capacitive electrodes comprises a body section and a plurality of projections extending from a first side of the body section; the plurality of projections extend along a first direction and sequentially arranged along a second direction, and the second direction is intercrossed with the first direction; on the surface provided with the plurality of self-capacitive electrodes, a recessed portion is encircled by every two projections and the body portion of each self-capacitive electrode; and in the recessed portion is provided with one of a plurality of projections of another self-capacitive electrode.

Further at least one embodiment of the present disclosure provides a display device comprising the above touch substrate.

Further at least one embodiment of the present disclosure provides a method for manufacturing a touch substrate, comprising: forming a conductive film; and patterning the conductive film and forming a plurality of self-capacitive electrodes arranged in a plurality of electrode rows and a plurality of electrode columns, in which a planar shape of each self-capacitive electrode on a surface provided with the plurality of self-capacitive electrodes comprises a body section and a plurality of projections extending from the same side of the body section; the plurality of projections extend along a first direction and sequentially arranged along a second direction, and the second direction is intercrossed with the first direction; on the surface provided with the plurality of self-capacitive electrodes, a recessed portion is formed by every two adjacent projections and the body section of each self-capacitive electrode; and in the recessed portion is provided with one of a plurality of projections in another self-capacitive electrode.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Figure 1:
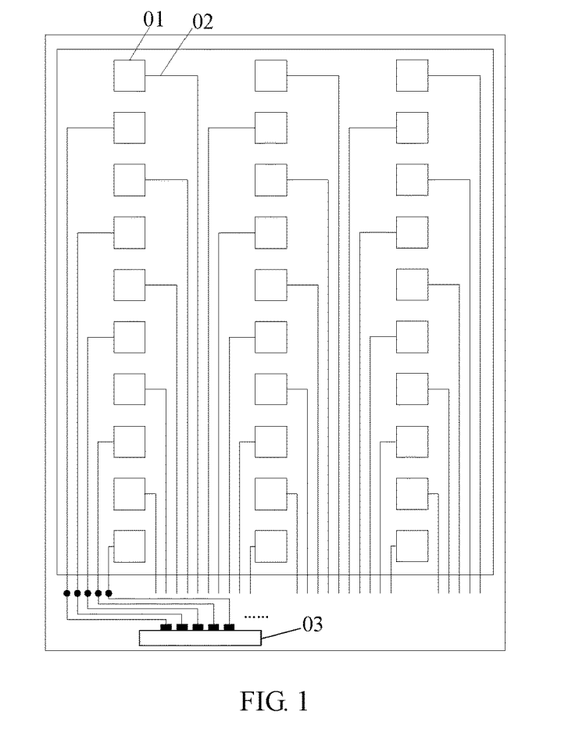
FIG. 1 is a schematic diagram of a touch substrate.

FIG. 1 is a schematic diagram of a touch substrate. As illustrated in FIG. 1, each small block represents one self-capacitive electrode 01, and each self-capacitive electrode is connected to a bonding pad region of a flexible printed circuit board (FPC) 03 through a lead (wiring) 02 so as to be electrically connected with a touch chip. That is to say, each self-capacitive electrode corresponds to one pin in the bonding pad region of the FPC. The dimension of the self-capacitive electrodes 01 is basically consistent among them; the dimension of each self-capacitive electrode (namely the dimension of each small block) is, for instance, 5 mm*5 mm; and the dimension of the self-capacitive electrode can affect the touch performance to a certain degree. When a touch display device operates, due to the touch of a touch object (e.g., a human finger), the capacitance of a corresponding self-capacitive electrode(s) changes, and hence the touch chip can determine the position of the touch object according to the variation of the capacitance.

The inventors of the present application has noted in research that: in the self-capacitive electrode pattern as illustrated in FIG. 1, as each self-capacitive electrode must be led to the FPC 03 through one lead, when the number of the self-capacitive electrodes is too large, the number of pins disposed in the bonding pad region of the FPC is large, so that the width of each pin is small and the distance between the pins is also small. However, in the current process level, the minimum pitch between the pins is generally 0.15 mm. For instance, the width of each pin is 0.1 mm and the spacing between the pins is 0.05 mm. Moreover, the yield of the combination of the leads and the pins needs yet to be improved. Therefore, how to reduce the number of the pins in the bonding pad region of the FPC without affecting the touch performance is a problem worthy of studying.

At least one embodiment of the present disclosure provides a touch substrate, a manufacturing method thereof and a display device. The touch substrate comprises a plurality of self-capacitive electrodes arranged in a plurality of electrode rows and a plurality of electrode columns. A planar shape of each self-capacitive electrode on a surface provided with the plurality of self-capacitive electrodes comprises a body section and a plurality of projections extending from a first side of the body section; the plurality of projections extend along a first direction and sequentially arranged along a second direction, and the second direction is intercrossed with the first direction; on the surface provided with the plurality of self-capacitive electrodes, a recessed portion is encircled by every two adjacent projections and the body section; and in the recessed portion is provided with one of a plurality of projections in another self-capacitive electrode. Thus, each self-capacitive electrode may be interlaced with the planar shape of at least another self-capacitive electrode disposed adjacent to the self-capacitive electrode, so that at least one self-capacitive electrode interlaced with the planar shape of a self-capacitive electrode may also be affected by touch when the self-capacitive electrode is touched, and hence the touch position can be determined via the self-capacitive electrode and the self-capacitive electrode adjacent to it. Therefore, the embodiment of the present disclosure can increase the dimension of the self-capacitive electrode while ensuring the touch accuracy, can greatly reduce the number of the self-capacitive electrodes and reduce the number of the pins in the bonding pad region, and hence can reduce the difficulty in the combination of the leads and the pins in the bonding pad region of the FPC, improve the yield of the combination of the leads and the pins, and save the costs.

For instance, the plurality of projections may be respectively a first projection, a second projection and a third projection; and on the surface provided with the plurality of self-capacitive electrodes, a first recessed portion is encircled by the first projection, the second projection and the body section, and a second recessed portion is encircled by the second projection, the third projection and the body section. For instance, the shape of the first recessed portion may be consistent (match) with the shape of one of the first projection, the second projection and the third projection, and the shape of the second recessed portion may be consistent (match) with another of the first projection, the second projection and the third projection.

Alternatively, for instance, the plurality of projections may be respectively a first projection and a second projection; and on the surface provided with the plurality of self-capacitive electrodes, a first recessed portion is encircled by the first projection, the second projection and the body section. For instance, the shape of the first recessed portion may be consistent (match) with the shape of one of the first projection and the second projection.

In the embodiment of the present disclosure, as the shape of the recessed portion encircled by every two projections and the body section of the self-capacitive electrode is set to be consistent with the shape of one projection of the self-capacitive electrode, the self-capacitive electrodes can be more tightly arranged, so that the touch accuracy can be guaranteed.

It should be noted that: in a specific implementation, adjacent self-capacitive electrodes are insulated from each other through an insulating layer disposed therebetween; and as the dimension of the self-capacitive electrodes is in millimeter but the dimension of the insulating layer between the adjacent self-capacitive electrodes is in micrometer, and the plurality of self-capacitive electrodes on the touch substrate are same, in order to allow the recessed portion encircled by the projections and the body section of each self-capacitive electrode (e.g., a first electrode) to be provided within it with one projection of another self-capacitive electrode (e.g., a second electrode), the dimension of the recessed portion is actually slightly greater than the dimension of the projection of the second electrode disposed therein, namely slightly greater than the dimension of corresponding projection of the first electrode. Therefore, "consistent shape" in the embodiment of the present disclosure refers to that the outline and the size of the pattern are roughly the same.

When the plurality of projections are respectively the first projection, the second projection and the third projection, in at least one embodiment, along the first direction, the distance from the top of one of the plurality of projections to an outer edge of the body section may be greater than the distance from the top of each of the remaining projections in the plurality of projections to the outer edge.

When the plurality of projections are respectively the first projection, the second projection and the third projection, for instance, in the same electrode row, each self-capacitive electrode may be adjacent to another self-capacitive electrode through one of the plurality of projections in the self-capacitive electrode.

When the plurality of projections are respectively the first projection, the second projection and the third projection, for instance, along the second direction, the sum of the dimensions of the first projection, the second projection, the third projection, the first recessed portion and the second recessed portion may be equal to the dimension of the body section.

Detailed description will be given below to the touch substrate, the manufacturing method thereof and the display device, provided by the embodiment of the present disclosure, with reference to the accompanying drawings.

First Embodiment

The embodiment provides a touch substrate, which comprises a plurality of self-capacitive electrodes. The planar shape of each self-capacitive electrode is formed by a body section and a first projection, a second projection and a third projection projected from a first side of the body section, namely has an E-shaped pattern. Moreover, along a first direction, the dimension of the second projection is greater than the dimension of each of the first projection and the third projection. The embodiment can increase the dimension of each self-capacitive electrode while ensuring the touch accuracy, and hence reduce the number of the self-capacitive electrodes and the number of leads which are respectively electrically connected with the self-capacitive electrodes.

Figure 2:
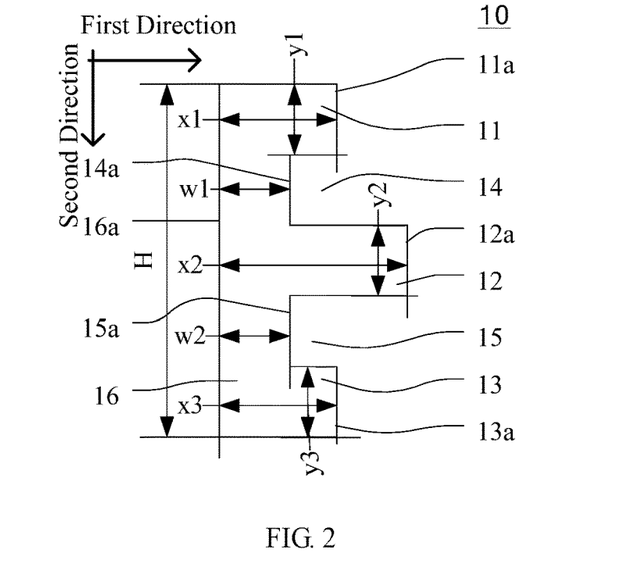
FIG. 2 is a schematic diagram of a self-capacitive electrode pattern provided by a first embodiment of the present disclosure.

For instance, as illustrated in FIG. 2, the planar shape of each self-capacitive electrode 10 is formed by a body section 16, a first projection 11, a second projection 12 and a third projection 13; the first projection 11, the second projection 12 and the third projection 13 extend from a first side (e.g., the right side in FIG. 2) of the body section 16; the projections all extend along a first direction and sequentially arranged along a second direction; and the second direction is intercrossed with the first direction (description is given with reference to FIG. 2 by only taking the case that the second direction is perpendicular to the first direction as an example, and the embodiment of the present disclosure includes but not limited to this case). On the surface provided with the plurality of self-capacitive electrodes, a first recessed portion 14 is encircled by the first projection 11, the second projection 12 and the body section 16, and a second recessed portion 15 is encircled by the second projection 12, the third projection 13 and the body section 16. The body section 16 has an outer edge 16a; the outer edge 16a is disposed on a second side (e.g., the left side in FIG. 2) of the body section and opposite to the first side (the right in FIG. 2) of the body section 16; and along the first direction, the distance x2 from the top 12a (one end away from the body section 16) of the second projection 12 to the outer edge 16a is greater than the distance x1 from the top 11a (one end away from the body section 16) of the first projection 11 to the outer edge 16a and the distance x3 from the top 13a (one end away from the body section 16) of the third projection 13 to the outer edge 16a.

For instance, the shape of the first recessed portion 14 may be consistent with that of the first projection 11, and the shape of the second recessed portion 15 may be consistent with that of the third projection 13.

Figure 3A:
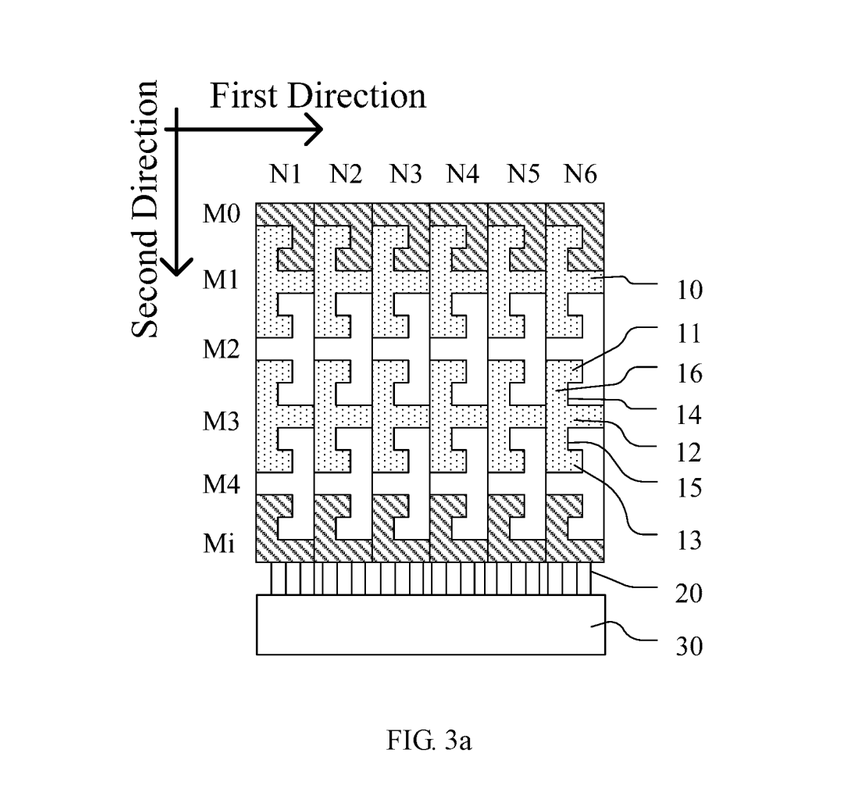
FIGS. 3a and 3b are respectively schematic diagrams of a touch substrate provided by the first embodiment of the present disclosure.
Figure 3B:
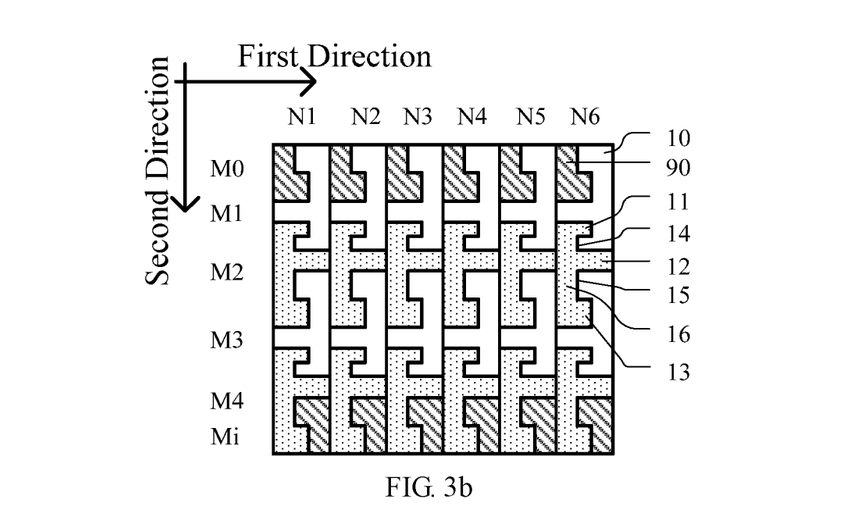

In at least one example, as illustrated in FIGS. 3a and 3b, the self-capacitive electrodes 10 are arranged in a plurality of electrode rows (e.g., electrode rows M1, M2, M3, M4 . . . ) and a plurality of electrode columns (e.g., electrode columns N1, N2, N3, N4, N5, N6 . . . ); and in the same electrode row, the projections in the planar shape of each self-capacitive electrode have the same projecting direction. Thus, the projections of the plurality of self-capacitive electrodes on the touch substrate can be more uniformly distributed, so that the dimensions of the self-capacitive electrodes can be increased while ensuring the touch accuracy.

For instance, the extension direction of each electrode row may be the same as the first direction, and the extension direction of each electrode column may be the same as the second direction; and in three adjacent electrode rows, the first projections of the self-capacitive electrodes disposed in a middle electrode row are respectively disposed in the first recessed portions of the self-capacitive electrodes in the previous electrode row, and the third projections of the self-capacitive electrodes disposed in the middle electrode row are respectively disposed in the second recessed portions of the self-capacitive electrodes in the next electrode row.

Figure 4:
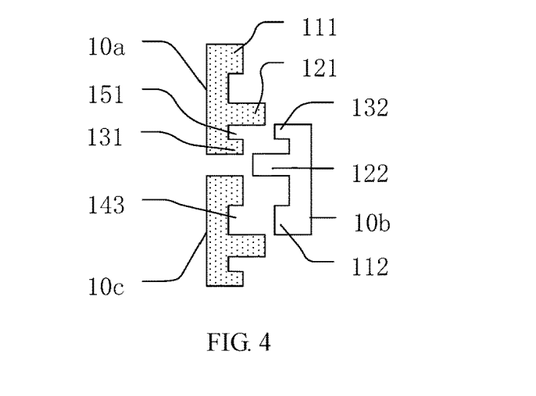
FIG. 4 is a schematic diagram illustrating the positional relationship of self-capacitive electrodes disposed in the same electrode column and in three adjacent electrode rows in the first embodiment of the present disclosure.

FIG. 4 illustrates self-capacitive electrodes 10a, 10b and 10c disposed in the same column and respectively disposed in three adjacent electrode rows. As illustrated in FIG. 4, because the planar shape of each self-capacitive electrode is consistent and the shape of a second recessed portion 151 of the self-capacitive electrode 10a is consistent with the shape of a third projection 131 thereof, a third projection 132 of the self-capacitive electrode 10b may be disposed in the second recessed portion 151 of the self-capacitive electrode 10a. Similarly, a first projection 112 of the self-capacitive electrode 10b may be disposed in a first recessed portion 143 of the self-capacitive electrode 10c.

In at least one example, as illustrated in FIGS. 3a and 3b, along the extension direction of the electrode row, the width of each electrode column may be equal to the width of each self-capacitive electrode. Thus, the self-capacitive electrodes can be more tightly arranged along the extension direction of the electrode row, so that the touch accuracy can be guaranteed. Description is given with reference to FIGS. 3a and 3b by only taking the case that the extension direction of the electrode row is the same as the first direction as an example. The embodiment of the present disclosure includes but not limited to this case.

In at least one example, as illustrated in FIGS. 3a and 3b, in the same electrode row, each self-capacitive electrode may be adjacent to another self-capacitive electrode through the second projection. Thus, the self-capacitive electrodes can also be more tightly arranged along the extension direction of the electrode row, and hence the touch accuracy can be further guaranteed. Moreover, the second projections of at least part of the self-capacitive electrodes can also extend between two electrode rows, so that the number of the self-capacitive electrodes in the extension direction of the electrode column can be reduced.

Description is given with reference to FIGS. 2 and 3a by taking the case that the first projection 11 and the third projection 13 have same shape as an example, and description is given with reference to FIGS. 3b and 4 by taking the case that the first projection 11 and the third projection 13 have different shapes as an example. Of course, the setting of the first projection 11 and the third projection 13 in the embodiment of the present disclosure includes but not limited to this case. In addition, as illustrated by M0 in FIGS. 3a and 3b, one row of half-E-shaped self-capacitive electrodes may also be disposed at the edge of the touch substrate of the embodiment so as to match with the (M1)th row of E-shaped self-capacitive electrodes 10. Similarly, as illustrated by Mi in FIGS. 3a and 3b, another row of half-E-shaped self-capacitive electrodes may also be arranged so as to match with the last row of E-shaped self-capacitive electrodes 10.

The working principle of the touch substrate provided by the embodiment is as follows: as illustrated in FIG. 3a, the touch substrate further comprises a plurality of leads 20, and one self-capacitive electrode 10 is electrically connected to an FPC 30 through each lead 20. Each lead 20 may be configured to charge the self-capacitive electrode 10 electrically connected with the lead; each self-capacitive electrode is a capacitor; each capacitor is charged, and certain time is required for fully charging the capacitor; as the plurality of E-shaped self-capacitive electrodes on the touch substrate have the same shape, the charging time of these same capacitors is basically consistent; and when a certain self-capacitive electrode is touched, the capacitance of the self-capacitive electrode will be increased, and the full charging time of the self-capacitive electrode will also be correspondingly increased, so that the touch chip (not shown in FIG. 3a) can determine whether there is a touch by determining the charging time of the E-shaped self-capacitive electrodes on the touch substrate and determine the touch position according to the variation of the charging time of the touched self-capacitive electrode and a self-capacitive electrode adjacent to it.

Figure 5A:
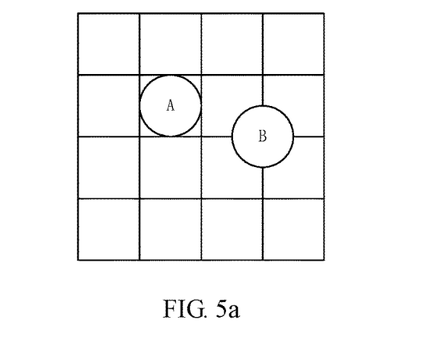
FIG. 5a is a schematic diagram illustrating the process of detecting the touch performance of a touch substrate via a 5 mm copper column.
Figure 5B:
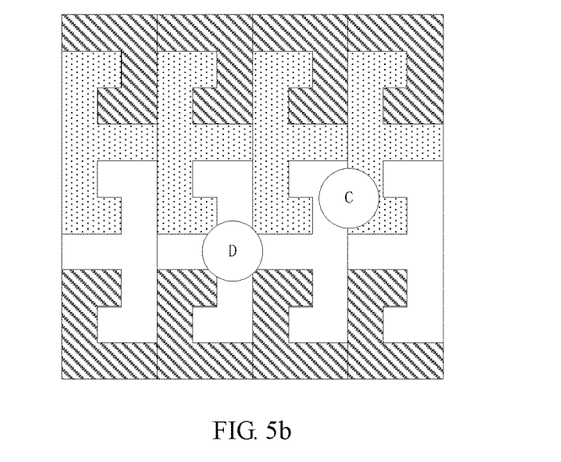
FIG. 5b is a schematic diagram illustrating the process of detecting the touch performance of the touch substrate provided by the first embodiment via a 5 mm copper column.

Supposing that a self-capacitive electrode pattern on the touch substrate provided by the embodiment is compared with a self-capacitive electrode pattern as illustrated in FIG. 1 via a copper column with the diameter of 5 mm, so as to compare the touch performance of the touch substrate provided by the embodiment and the touch performance of the touch substrate as illustrated in FIG. 1, the comparative results are exemplified below. In the self-capacitive pattern as illustrated in FIG. 1, as illustrated in FIG. 5a, the copper column can at least result in the capacitance variation of one self-capacitive electrode, as illustrated by position A, and can also at most result in the capacitance variation of four self-capacitive electrodes, as illustrated by position B. In the pattern of the E-shaped self-capacitive electrodes in the embodiment, for instance, when the dimension of each self-capacitive electrode (as illustrated in FIG. 2) is set to be x2=8 mm, x1=x3=5 mm, w1=w2=3 mm, y1=y2=y3=3 mm, as illustrated in FIG. 5b, the copper column with the diameter of 5 mm can at least result in the capacitance variation of two self-capacitive electrodes, as illustrated by position C, and can at most result in the capacitance variation of six self-capacitive electrodes, as illustrated by position D. Thus, the touch performance of the touch substrate provided by the embodiment is better than the touch performance of the touch substrate as illustrated in FIG. 1.

Description is given below on the effect of reducing the number of the self-capacitive electrodes in the touch substrate provided by the embodiment by taking a touch substrate in which the dimension of a display area is 80 mm*190 mm as an example. For instance, if the self-capacitive electrode pattern as illustrated in FIG. 1 is adopted and the dimension of each self-capacitive electrode is 5 mm*5 mm, the display area of the touch substrate is provided with 16*38=608 self-capacitive electrodes, namely the bonding pad region of the FPC at least requires 608 pins. If the self-capacitive electrode pattern as illustrated in FIG. 3a provided by the embodiment is adopted, for instance, when the dimension of each self-capacitive electrode (as illustrated in FIG. 2) is set to be x2=8 mm, x1=x3=5 mm, w1=w2=3 mm, y1=y2=y3=3 mm, the touch substrate only needs 10*22=220 self-capacitive electrodes, namely the bonding pad region of the FPC requires 220 pins only, so that the number of the pins is only 36% of the case as illustrated in FIG. 1. Compared with the case as illustrated in FIG. 1, the embodiment can greatly reduce the number of the pins in the bonding pad region, and hence can save a great amount of space, reduce the cost of the FPC and improve the yield of the combination of the leads and the pins in the bonding pad region of the FPC.

It should be noted that the dimension of the E-shaped self-capacitive electrodes can be properly adjusted by those skilled in the art according to actual conditions so as to satisfy the requirements of different dimensions and touch accuracies, as for different touch substrates with display areas of different sizes.

As the touch area of the human finger on the touch substrate generally does not exceed 6 mm*6 mm, in order to ensure the touch accuracy, in at least one example, along the first direction, as illustrated in FIG. 2, both the distance w1 from the bottom 14a (one end close to the body section 16) of the first recessed portion 14 to the outer edge 16a and the distance w2 from the bottom 15a (one end close to the body section 16) of the second recessed portion 15 to the outer edge 16a may be greater than 0 mm and less than or equal to 6 mm, preferably be greater than 0 mm and less than or equal to 5 mm.

In at least one example, the dimension of each of the first projection 11, the second projection 12 and the third projection 13 may be greater than 0 mm and less than or equal to 5 mm along the second direction. That is to say, each of y1, y2 and y3 in FIG. 2 may be greater than 0 mm and less than or equal to 5 mm.

As the shape of the first projection 11 is consistent with that of the first recessed portion 14 and the shape of the third projection 13 is consistent with that of the second recessed portion 15, in at least one example, as illustrated in FIG. 2, the distance x1 from the top 11a of the first projection 11 to the outer edge 16a, the distance x2 from the top 12a of the second projection 12 to the outer edge 16a, the distance x3 from the top 13a of the third projection 13 to the outer edge 16a, the distance w1 from the bottom 14a of the first recessed portion 14 to the outer edge 16a, and the distance w2 from the bottom 15a of the second recessed portion 15 to the outer edge 16a are set to be: x1+w1=x2=x3+w2. Thus, the self-capacitive electrodes can be more tightly arranged along the extension direction of the electrode row, and hence the touch accuracy can be further guaranteed.

In at least one example, as illustrated in FIG. 2, the sum of the dimensions of the first projection 11, the second projection 12, the third projection 13, the first recessed portion 14 and the second recessed portion 15 along the second direction may be equal to the dimension of the body section 16 along the second direction, namely 2y1+y2+2y3=H. Thus, the self-capacitive electrodes can be more tightly arranged along the extension direction of the electrode column, and hence the touch accuracy can be further guaranteed.

As in the touch substrate, the extension direction of the electrode rows is generally the same as the extension direction of short sides of the touch substrate, and the extension direction of the electrode columns is generally the same as the extension direction of long sides of the touch substrate, in at least one example, the dimension of the self-capacitive electrode along the second direction may be greater than or equal to the dimension of the self-capacitive electrode along the first direction. Thus, the number of the self-capacitive electrodes in each row and each column can be simultaneously reduced. For instance, in the case as illustrated in FIG. 2, the dimension H of the self-capacitive electrode along the second direction may be greater than the dimension x2 of the self-capacitive electrode along the first direction.

Second Embodiment

The embodiment provides a touch substrate. In the touch substrate, each self-capacitive electrode is also formed by a body section and a first projection 11, a second projection 12 and a third projection 13 projected from a first side of the body section, namely also has an E-shaped pattern. The embodiment can increase the dimension of each self-capacitive electrode while ensuring the touch accuracy, and hence reduce the number of the self-capacitive electrodes and the number of leads which are respectively electrically connected with the self-capacitive electrodes.

Figure 6:
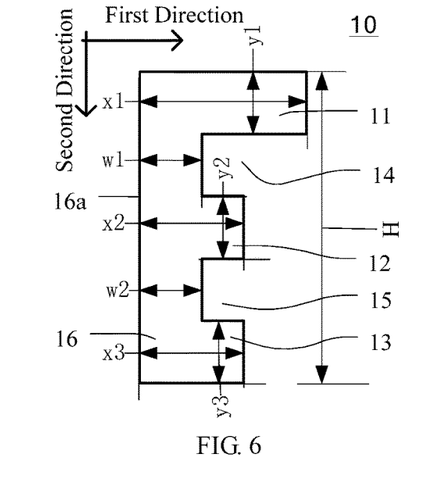
FIG. 6 is a schematic diagram of a self-capacitive electrode pattern provided by a second embodiment of the present disclosure.

The difference between the present embodiment and the first embodiment is that: as illustrated in FIG. 6, the distance x1 from the top 11a of the first projection 11 to an outer edge 16a is greater than the distance x2 from the top 12a of the second projection 12 to the outer edge 16a and the distance x3 from the top 13a of the third projection 13 to the outer edge 16a.

For instance, on a surface provided with the self-capacitive electrodes 10, the shape of a first recessed portion 14 may be consistent with that of the third projection 13, and the shape of a second recessed portion 15 may be consistent with that of the second projection 12.

Figure 7A:
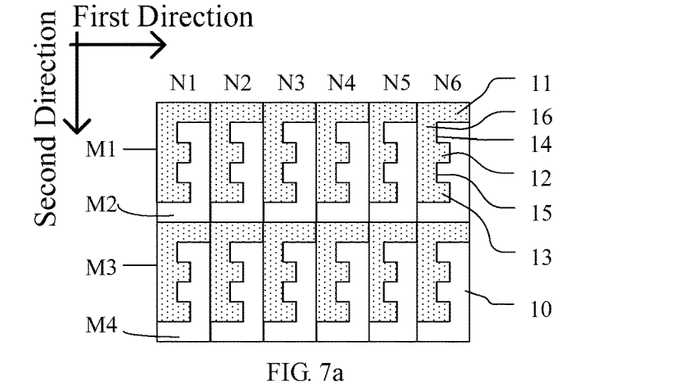
FIGS. 7a and 7b are respectively schematic diagrams of a touch substrate provided by the second embodiment of the present disclosure.
Figure 7B:
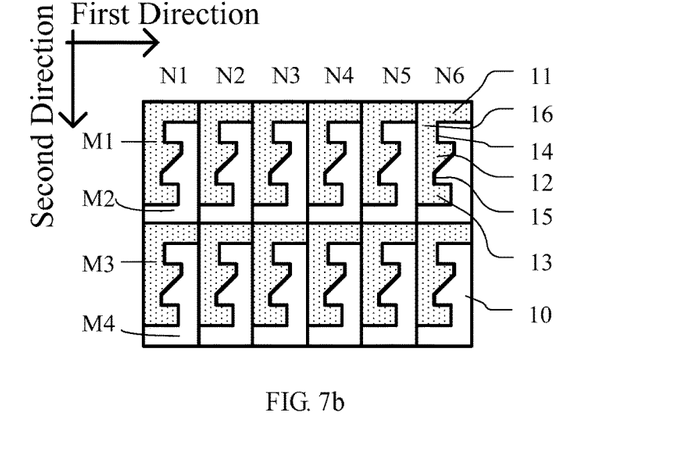

In at least one example, as illustrated in FIGS. 7a and 7b, the self-capacitive electrodes 10 are arranged in a plurality of electrode rows (e.g., electrode rows M1, M2, M3, M4 . . . ) and a plurality of electrode columns (e.g., electrode columns N1, N2, N3, N4, N5, N6 . . . ); and in the same electrode row, the projections in the planar shape of each self-capacitive electrode have the same projecting direction. Thus, the projections of the plurality of self-capacitive electrodes on the touch substrate can be more uniformly distributed, so that the dimension of the self-capacitive electrodes can be increased while ensuring the touch accuracy.

For instance, the extension direction of each electrode row may be the same as the first direction, and the extension direction of each electrode column may be the same as the second direction; and in every two adjacent electrode rows, the second projections 12 of the self-capacitive electrodes 10 in one electrode row are respectively disposed in the second recessed portions 15 of the self-capacitive electrodes 10 in the other electrode row, and the third projections 13 of the self-capacitive electrodes 10 in one electrode row are respectively disposed in the first recessed portions 14 of the self-capacitive electrodes 10 in the other electrode row.

Figure 8:
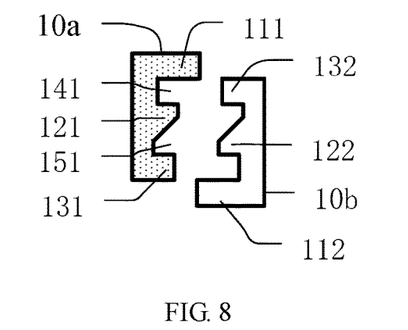
FIG. 8 is a schematic diagram illustrating the positional relationship of self-capacitive electrodes disposed in the same electrode column and in two adjacent electrode rows in the second embodiment of the present disclosure.

For instance, FIG. 8 illustrates two self-capacitive electrodes 10a and 10b disposed in the same column and respectively disposed in two electrode rows. As illustrated in FIG. 8, as the planar shape of each self-capacitive electrode is consistent and the shape of a second recessed portion 151 of the self-capacitive electrode 10a is consistent with the shape of a second projection 121 of the self-capacitive electrode 10a, a second projection 122 of the self-capacitive electrode 10b may be disposed in the second recessed portion 151 of the self-capacitive electrode 10a. Similarly, a third projection 132 of the self-capacitive electrode 10b may be disposed in a first recessed portion 141 of the self-capacitive electrode 10a.

Description is given with reference to FIGS. 6 and 7a by taking the case that the second projection 12 and the third projection 13 have same shape as an example, and description is given with reference to FIGS. 7b and 8 by taking the case that the second projection 12 and the third projection 13 have different shapes as an example. Of course, the setting of the second projection 12 and the third projection 13 in the embodiment of the present disclosure includes but not limited this case.

The embodiment can increase the dimension of each self-capacitive electrode while ensuring the touch accuracy, and hence reduce the number of the self-capacitive electrodes and the number of leads. The specific principle of the embodiment is similar to that of the first embodiment. No further description will be given here.

Figure 9:
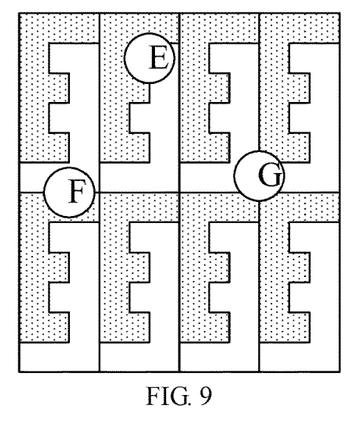
FIG. 9 is a schematic diagram illustrating the process of detecting the touch performance of the touch substrate provided by the second embodiment of the present disclosure via a 5 mm copper column.

In the pattern of the E-shaped self-capacitive electrodes provided by the embodiment, for instance, when the dimension of each self-capacitive electrode (as illustrated in FIG. 6) is set to be x1=8 mm, x2=x3=5 mm, w1=w2=3 mm, y1=y2=y3=3 mm, as illustrated in FIG. 9, a copper column with the diameter of 5 mm can at least result in the capacitance variation of two self-capacitive electrodes, as illustrated by positions E and F, and can at most result in the capacitance variation of five self-capacitive electrodes, as illustrated by a position G. Compared with the case as illustrated in FIG. 1, the touch substrate provided by the embodiment has better touch performance.

As for the effect of reducing the number of the self-capacitive electrodes in the touch substrate provided by the embodiment, in a touch substrate of which the dimension of a display area is 80 mm*190 mm, if a self-capacitive electrode pattern as illustrated in FIG. 7a provided by the embodiment is adopted, for instance, when the dimension of each self-capacitive electrode (as illustrated in FIG. 6) is set to be x1=8 mm, x2=x3=5 mm, w1=w2=3 mm, y1=y2=y3=3 mm, the touch substrate only needs 10*20=200 self-capacitive electrodes, namely the bonding pad region of the FPC only requires 200 pins. Compared with the case as illustrated in FIG. 1, the embodiment can greatly reduce the number of the pins in the bonding pad region, and hence can save a great amount of space, reduce the cost of the FPC and improve the yield of the combination of the leads and the pins in the bonding pad region of the FPC.

It should be noted that the dimension of the E-shaped self-capacitive electrodes can be properly adjusted by those skilled in the art according to actual conditions so as to satisfy the requirements of different dimensions and touch accuracies, as for different touch substrates with display areas of different sizes.

In at least one example, as illustrated in FIG. 6, the dimension of various parts of the self-capacitive electrode may be set to be x3+w1=x1=x2+w2, so that the self-capacitive electrodes can be more tightly arranged along the extension direction of the electrode row, and hence the touch accuracy can be further guaranteed.

In at least one example, as illustrated in FIG. 6, the sum of the dimensions of the first projection 11, the second projection 12, the third projection 13, the first recessed portion 14 and the second recessed portion 15 along the second direction may be equal to the dimension of the body section 16 along the second direction, namely y1+2y2+2y3=H. Thus, the self-capacitive electrodes can be more tightly arranged along the extension direction of the electrode column, and hence the touch accuracy can be further guaranteed.

In the embodiment, the setting of the width of each electrode column along the extension direction of the electrode row, the setting of the position of adjacent self-capacitive electrodes in the same electrode row, the dimensional range of the first recessed portion 14 and the second recessed portion 15 along the first direction, and the dimensional range of the first projection, the second projection and the third projection along the second direction may refer to relevant description in the first embodiment. No further description will be given here.

Third Embodiment

Figure 10:
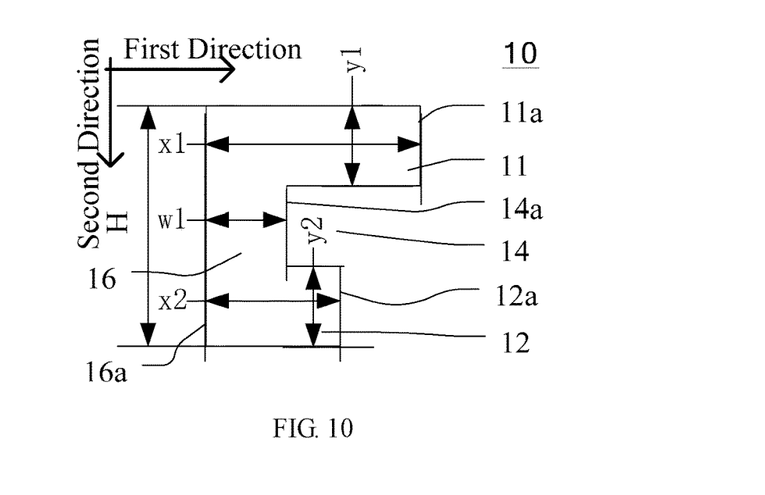
FIG. 10 is a schematic diagram of a self-capacitive electrode pattern provided by a third embodiment of the present disclosure.

The embodiment provides a touch substrate, which comprises a plurality of self-capacitive electrodes. As illustrated in FIG. 10, each self-capacitive electrode is formed by a body section 16 and by a first projection 11 and a second projection 12 that are projected from a first side of the body section 16 (e.g., the right side of the body section 16 in FIG. 10); both the first projection 11 and the second projection 12 extend along a first direction and sequentially arranged along a second direction, and the second direction is intercrossed with the first direction (description is given with reference to FIG. 10 by only taking the case that the second direction is perpendicular to the first direction as an example, and the embodiment of the present disclosure includes but not limited to this case); and a first recessed portion 14 is encircled by the first projection 11, the second projection 12 and the body section 16. The embodiment can increase the dimension of each self-capacitive electrode while ensuring the touch accuracy, and hence reduce the number of the self-capacitive electrodes and the number of leads which are respectively electrically connected with the self-capacitive electrodes.

For instance, the shape of the first recessed portion 14 may be consistent with the shape of one of the first projection 11 and the second projection 12.

For instance, as illustrated in FIG. 10, the body section 16 has an outer edge 16a; the outer edge 16a is disposed on a second side of the body section (e.g., the left side of the body section 16 in FIG. 10) and opposite to the first side (the right side of the body section 16 in FIG. 10) from which the first projection and the second projection extend out of the body section 16; and along the first direction, the distance x1 from the top 11a of the first projection 11 to the outer edge 16a may be greater than the distance x2 from the top 12a of the second projection 12 to the outer edge 16a. In this case, for instance, the shape of the first recessed portion 14 may be consistent with that of the second projection 12.

Figure 11:
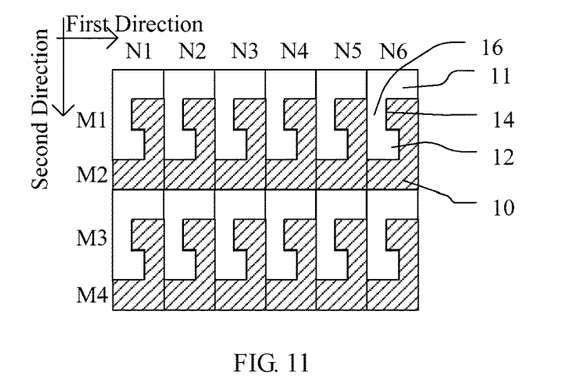
FIG. 11 is a schematic diagram of a touch substrate provided by the third embodiment of the present disclosure.

In at least one example, as illustrated in FIG. 11, the self-capacitive electrodes 10 are arranged in a plurality of electrode rows (e.g., electrode rows M1, M2, M3, M4 . . . ) and a plurality of electrode columns (e.g., electrode columns N1, N2, N3, N4, N5, N6 . . . ); and in the same electrode row, the projections in the planar shape of each self-capacitive electrode have the same projecting direction. Thus, the projections of the plurality of self-capacitive electrodes on the touch substrate can be more uniformly distributed, so that the dimensions of the self-capacitive electrodes can be increased while ensuring the touch accuracy.

For instance, the extension direction of each electrode row may be the same as the first direction, and the extension direction of each electrode column may be the same as the second direction; and in two adjacent electrode rows, the second projections 12 of the self-capacitive electrodes 10 in one electrode row are respectively disposed in the first recessed portions 14 of the self-capacitive electrodes 10 in the other electrode row.

In at least one example, as illustrated in FIG. 11, along the extension direction of the electrode row, the width of each electrode column may be equal to the width of each self-capacitive electrode. Thus, the self-capacitive electrodes can be more tightly arranged along the extension direction of the electrode row, and hence the touch accuracy can be guaranteed.

Description is given with reference to FIG. 11 by only taking the case that the extension direction of the electrode row is consistent with the first direction as an example. The embodiment includes but not limited to this case.

In at least one example, as illustrated in FIG. 11, in the same electrode row, each self-capacitive electrode may be adjacent to another self-capacitive electrode through the first projection 11. Thus, the self-capacitive electrodes can also be more tightly arranged along the extension direction of the electrode row, and hence the touch accuracy can be further guaranteed. Moreover, the first projections of at least part of self-capacitive electrodes can also extend between two electrode rows, so that the number of the self-capacitive electrodes in the extension direction of the electrode column can be reduced.

The working principle of the touch substrate provided by the embodiment is similar to that of the first embodiment. No further description will be given here.

In the pattern of the E-shaped self-capacitive electrodes provided by the embodiment, for instance, when the dimension of each self-capacitive electrode (as illustrated in FIG.

Figure 12:
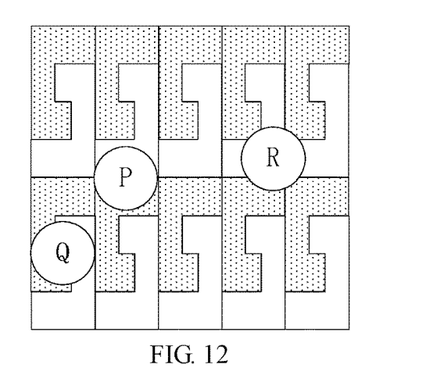
FIG. 12 is a schematic diagram illustrating the process of detecting the touch performance of the touch substrate provided by the third embodiment of the present disclosure via a 5 mm copper column.

10) is set to be x1=8 mm, x2=5 mm, w1=3 mm, y1=y2=3 mm, as illustrated in FIG. 12, a copper column with the diameter of 5 mm can at least result in the capacitance variation of two self-capacitive electrodes, as illustrated by positions P and Q, and can at most result in the capacitance variation of six self-capacitive electrodes, as illustrated by position R. Compared with the case as illustrated in FIG. 1, the touch substrate provided by the embodiment has better touch performance.

As for the effect of reducing the number of the self-capacitive electrodes in the touch substrate provided by the embodiment, in a touch substrate of which the dimension of a display area is 80 mm*190 mm, if a self-capacitive electrode pattern as illustrated in FIG. 11 provided by the embodiment is adopted, for instance, when the dimension of each self-capacitive electrode (as illustrated in FIG. 10) is set to be x1=8 mm, x2=5 mm, w1=3 mm, y1=y2=3 mm, the touch substrate almost needs 10*32=320 self-capacitive electrodes, namely the bonding pad region of the FPC only requires 320 pins. Compared with the case as illustrated in FIG. 1, the embodiment can greatly reduce the number of the pins in the bonding pad region, and hence can save a great amount of space, reduce the cost of the FPC and improve the yield of the combination of the leads and the pins in the bonding pad region of the FPC.

It should be noted that the dimensions of the self-capacitive electrodes can be properly adjusted by those skilled in the art according to actual conditions so as to satisfy the requirements of different dimensions and touch accuracies, as for different touch substrates with display areas of different sizes.

As the touch area of the human finger on the touch substrate generally does not exceed 6 mm*6 mm, in order to ensure the touch accuracy, in at least one example, as illustrated in FIG. 10, along the first direction, the distance w1 from the bottom 14a of the first recessed portion 14 to the outer edge 16a may be greater than 0 mm and less than or equal to 6 mm, preferably be greater than 0 mm and less than or equal to 5 mm.

In at least one example, along the second direction, both the dimension y1 of the first projection 11 and the dimension y2 of the second projection 12 may be greater than 0 mm and less than or equal to 5 mm.

As the shape of the second projection 12 is consistent with that of the first recessed portion 14, in at least one example, as illustrated in FIG. 10, the distance x2 from the top 12a of the second projection 12 to the outer edge 16a and the distance w1 from the bottom 14a of the first recessed portion 14 to the outer edge 16a may be set to be: x2+w1=x2. Thus, the self-capacitive electrodes can be more tightly arranged along the extension direction of the electrode row, and hence the touch accuracy can be further guaranteed.

In at least one example, as illustrated in FIG. 10, the sum of the dimensions of the first projection 11, the second projection 12 and the first recessed portion 14 along the second direction may be equal to the dimension of the body section 16 along the second direction, namely y1+2y2=H. Thus, the self-capacitive electrodes can be more tightly arranged along the extension direction of the electrode column, and hence the touch accuracy can be further guaranteed.

Figure 13:
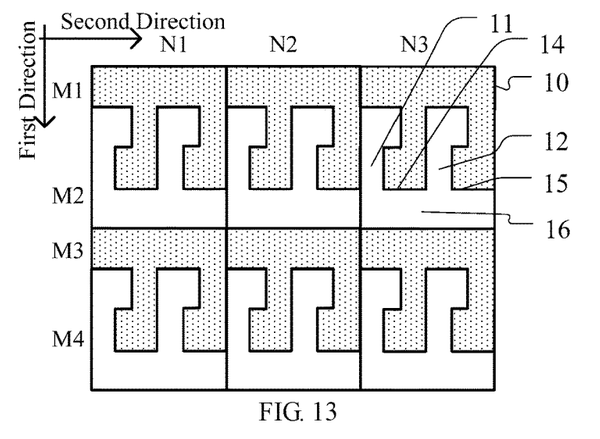
FIG. 13 is a schematic diagram of another touch substrate provided by the third embodiment of the present disclosure.

In at least one example, as illustrated in FIG. 13, on a surface provided with the plurality of self-capacitive electrodes of the touch substrate, a second recessed portion 15 may be encircled by the second projection 12 and the body section 16, and the shape of the second recessed portion 15 is consistent with the shape of the other of the first projection 11 and the second projection 12. In this case, the planar shape of each self-capacitive electrode is F-shaped.

It should be noted that the touch substrate provided by the first embodiment, the second embodiment and the third embodiment may be any type of touch substrate, for instance, may be a display substrate (e.g., an array substrate or a color filter (CF) substrate) provided with the plurality of self-capacitive electrodes.

Fourth Embodiment

The embodiment provides a display device, which comprises the touch substrate provided by any foregoing embodiment.

Figure 14:
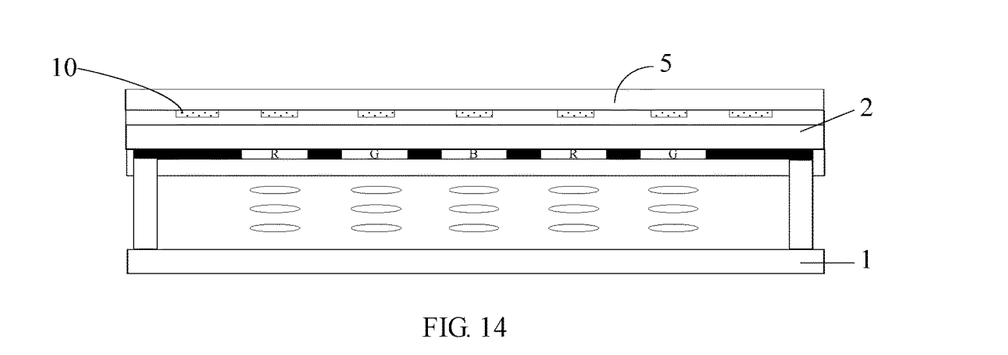
FIG. 14 is a schematic diagram of a display device provided by a fourth embodiment of the present disclosure.

For instance, as illustrated in FIG. 14, the display device may comprise an array substrate 1 and an opposing substrate 2 which are arranged opposite to each other, or the display device may comprise an array substrate 1 and an opposing substrate 2 arranged opposite to each other, and a protective substrate 5 disposed on one side of the opposing substrate 2, which side is away from the array substrate. The touch substrate provided by any foregoing embodiment may be any one of the array substrate 1, the opposing substrate 2 and the protective substrate 5. Description is given with reference to FIG. 14 by taking the case that the self-capacitive electrodes 10 are disposed on the protective substrate 5 (namely the protective substrate 5 is taken as the touch substrate) as an example.

For instance, the display device may be an in-cell touch display device. Thus, the self-capacitive electrodes may be synchronously formed with common electrodes in a display area, so that the manufacturing process can be reduced.

For instance, the opposing substrate 2 may be a CF substrate, namely the opposing substrate 2 is provided with a CF layer, for instance, including red color filter patterns R, green color filter patterns G and blue color filter patterns B; or the opposing substrate 2 may also be a transparent substrate, namely no CF layer is disposed thereon.

The display device provided by the embodiment may be: any product or component with display function such as a liquid crystal display (LCD) panel, e-paper, an organic light-emitting diode (OLED) panel, a mobile phone, a tablet PC, a TV, a display, a notebook computer, a digital picture frame, a navigator, or the like.

Fifth Embodiment

Figure 15:
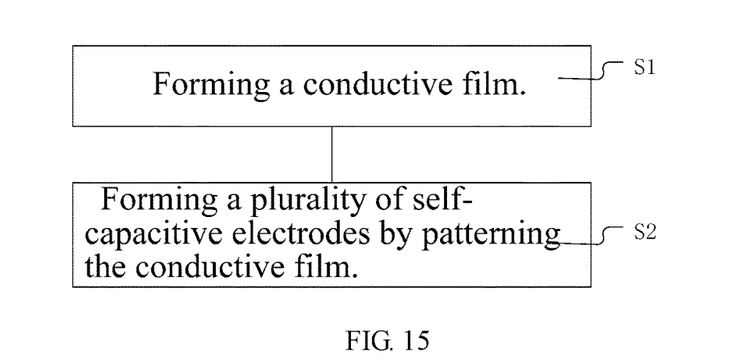
FIG. 15 is a flowchart of a method for manufacturing a touch substrate provided by the fifth embodiment of the present disclosure.

The embodiment provides a method for manufacturing a touch substrate. As illustrated in FIG. 15, the method comprises the operation: S1, forming a conductive film; and S2, forming a plurality of self-capacitive electrodes by patterning the conductive film.

In the step S1, the conductive film is, for instance, made from transparent metal oxide materials, e.g., indium tin oxide (ITO), indium zinc oxide (IZO) and indium gallium zinc oxide (IGZO).

In the step S2, the plurality of self-capacitive electrodes are arranged in a plurality of electrode rows and a plurality of electrode columns; a planar shape of each self-capacitive electrode on a surface provided with the plurality of self-capacitive electrodes comprises a body section and a plurality of projections extending from a first side of the body section; the plurality of projections extend along a first direction and sequentially arranged along a second direction, and the second direction is intercrossed with the first direction; on the surface provided with the plurality of self-capacitive electrodes, a recessed portion is encircled by every two adjacent projections and the body section; and in the recessed portion is provided with one of a plurality of projections in another self-capacitive electrode.

For instance, the plurality of projections may be respectively a first projection, a second projection and a third projection; and on the surface provided with the plurality of self-capacitive electrodes, a first recessed portion is encircled by the first projection, the second projection and the body section, and a second recessed portion is encircled by the second projection, the third projection and the body section. For instance, the shape of the first recessed portion may be consistent with the shape of one of the first projection, the second projection and the third projection, and the shape of the second recessed portion may be consistent with that of another of the first projection, the second projection and the third projection.

Alternatively, for instance, the plurality of projections may be respectively a first projection and a second projection; and on the surface provided with the plurality of self-capacitive electrodes, a first recessed portion is encircled by the first projection, the second projection and the body section. For instance, the shape of the first recessed portion may be consistent with the shape of one of the first projection and the second projection.

The embodiments of the case that the plurality of projections include three projections or two projections may refer to relevant description in the first embodiment, the second embodiment and the third embodiment. No further description will be given here.

In the step S2, the patterning process may be any process for forming a specified pattern. For instance, the masking process, for instance, including exposure, development and etching, commonly used in the field may be adopted.

In the step S2, for instance, when the touch substrate is also provided with common electrodes, the common electrodes may also be formed in the process of patterning the conductive film, so that the manufacturing process can be reduced.

In addition, the method for manufacturing the touch substrate provided by the embodiment, for instance, may further comprise the step of forming a plurality of leads. In the step, each lead is electrically connected with one self-capacitive electrode.

The embodiments of the present disclosure provides detailed description on the case that the planar shape of the self-capacitive electrode in the touch substrate includes three projections or two projections. Of course, on the basis of the technical concept of the present disclosure, the planar shape of the self-capacitive electrode may also include four or more projections. Recessed portions are encircled by the projections, and the shape of at least partial projections is consistent with the shape of at least partial recessed portions.

What are described above is related to the illustrative embodiments of the disclosure only and not limitative to the scope of the disclosure; the scopes of the disclosure are defined by the accompanying claims.

The application claims priority to the Chinese patent application No. 201510531652.2, filed Aug. 26, 2015, the entire disclosure of which is incorporated herein by reference as part of the present application.

What is claimed is:

1. A touch substrate, comprising a plurality of self-capacitive electrodes arranged in a plurality of electrode rows and a plurality of electrode columns, wherein
   a planar shape of each self-capacitive electrode on a surface provided with the plurality of self-capacitive electrodes comprises a body section and a plurality of projections extending from a first side of the body section;
   the plurality of projections extend along a first direction and sequentially arranged along a second direction, and the second direction is intercrossed with the first direction;
   on the surface provided with the plurality of self-capacitive electrodes, a recessed portion is encircled by every two projections and the body section of each self-capacitive electrode; and in the recessed portion is provided with one of a plurality of projections of another self-capacitive electrode;
   sizes of the plurality of self-capacitive electrodes in the second direction are same; and
   the planar shapes of the plurality of self-capacitive electrodes are same, so as to allow the one of the plurality of projections of the another self-capacitive electrode to be provided in the recessed portion.

2. The touch substrate according to claim 1, wherein the plurality of projections are respectively a first projection, a second projection and a third projection; on the surface provided with the plurality of self-capacitive electrodes, a first recessed portion is encircled by the first projection, the second projection and the body section; and a second recessed portion is encircled by the second projection, the third projection and the body section; or
   the plurality of projections are respectively a first projection and a second projection; and on the surface provided with the plurality of self-capacitive electrodes, a first recessed portion is encircled by the first projection, the second projection and the body section.

3. The touch substrate according to claim 2, wherein the plurality of projections are respectively the first projection, the second projection and the third projection; a shape of the first recessed portion is consistent with a shape of one of the first projection, the second projection and the third projection; and a shape of the second recessed portion is consistent with that of another of the first projection, the second projection and the third projection; or
   the plurality of projections are respectively the first projection and the second projection; and a shape of the first recessed portion is consistent with a shape of one of the first projection and the second projection.

4. The touch substrate according to claim 1, wherein
   in a same electrode row, the projections in the planar shape of each self-capacitive electrode on the surface provided with the plurality of self-capacitive electrodes have a same projecting direction.

5. The touch substrate according to claim 1, wherein
   along an extension direction of the electrode row, a width of each electrode column is equal to a width of each self-capacitive electrode.

6. The touch substrate according to claim 1, wherein
   along the second direction, a dimension of each of the plurality of projections is greater than 0 mm and less than or equal to 5 mm.

7. The touch substrate according to claim 1, wherein
   the body section has an outer edge which is disposed on a second side of the body section; and the second side is opposite to the first side of the body section; and
   a distance from a bottom of the recessed portion to the outer edge is greater than 0 mm and less than or equal to 6 mm along the first direction.

8. The touch substrate according to claim 2, wherein
the body section has an outer edge which is disposed on a second side of the body section; the second side is opposite to the first side of the body section;
the plurality of projections are respectively the first projection, the second projection and the third projection; and
along the first direction, a distance from a top of one of the plurality of projections to the outer edge is greater than a distance from a top of each of the remaining projections in the plurality of projections to the outer edge.

9. The touch substrate according to claim 8, wherein
in a same electrode row, each self-capacitive electrode is adjacent to another self-capacitive electrode through one of the plurality of projections in the self-capacitive electrode.

10. The touch substrate according to claim 8, wherein
along the second direction, a sum of dimensions of the first projection, the second projection, the third projection, the first recessed portion and the second recessed portion is equal to a dimension of the body section.

11. The touch substrate according to claim 8, wherein
a distance from a top of the second projection to the outer edge is greater than a distance from a top of each of the first projection and the third projection to the outer edge; and
on the surface provided with the plurality of self-capacitive electrodes, a shape of the first recessed portion is consistent with a shape of the first projection, and a shape of the second recessed portion is consistent with a shape of the third projection.

12. The touch substrate according to claim 11, wherein
an extension direction of each electrode row is the same as the first direction; and an extension direction of each electrode column is the same as the second direction; and
in three adjacent electrode rows, the first projections of the self-capacitive electrodes disposed in a middle electrode row are respectively disposed in the first recessed portions of the self-capacitive electrodes in a previous electrode row, and the third projections of the self-capacitive electrodes in the electrode row are respectively disposed in the second recessed portions of the self-capacitive electrodes in the next electrode row.

13. The touch substrate according to claim 8, wherein
a distance from a top of the first projection to the outer edge is greater than a distance from a top of each of the second projection and the third projection to the outer edge; and
on the surface provided with the plurality of self-capacitive electrodes, a shape of the first recessed portion is consistent with that of the third projection, and a shape of the second recessed portion is consistent with that of the second projection.

14. The touch substrate according to claim 13, wherein
an extension direction of each electrode row is the same as the first direction; and an extension direction of each electrode column is the same as the second direction; and
in every two adjacent electrode rows, the second projections of the self-capacitive electrodes in one electrode row are respectively disposed in the second recessed portions of the self-capacitive electrodes in the other electrode row, and the third projections of the self-capacitive electrodes in the electrode row are respectively disposed in the first recessed portions of the self-capacitive electrodes in the other electrode row.

15. The touch substrate according to claim 3, wherein
the plurality of projections are respectively the first projection and the second projection; and
on the surface provided with the plurality of self-capacitive electrodes, a second recessed portion is encircled by the second projection and the body section, and a shape of the second recessed portion is consistent with a shape of the other of the first projection and the second projection.

16. A display device, comprising the touch substrate according to claim 1.

17. The touch substrate according to claim 1, wherein the plurality of projections are respectively a first projection and a second projection;
on the surface provided with the plurality of self-capacitive electrodes, a first recessed portion is encircled by the first projection, the second projection and the body section; and
a shape of the first recessed portion and a shape of one of the first projection and the second projection are same.

18. A method for manufacturing a touch substrate, comprising:
forming a conductive film; and
patterning the conductive film and forming a plurality of self-capacitive electrodes arranged in a plurality of electrode rows and a plurality of electrode columns,
wherein a planar shape of each self-capacitive electrode on a surface provided with the plurality of self-capacitive electrodes comprises a body section and a plurality of projections extending from the same side of the body section; the plurality of projections extend along a first direction and sequentially arranged along a second direction, and the second direction is intercrossed with the first direction; on the surface provided with the plurality of self-capacitive electrodes, a recessed portion is formed by every two adjacent projections and the body section of each self-capacitive electrode; and in the recessed portion is provided with one of a plurality of projections in another self-capacitive electrode;
sizes of the plurality of self-capacitive electrodes in the second direction are same; and
the planar shapes of the plurality of self-capacitive electrodes are same, so as to allow the one of the plurality of projections of the another self-capacitive electrode to be provided in the recessed portion.

19. A touch substrate, comprising a plurality of self-capacitive electrodes arranged in a plurality of electrode rows and a plurality of electrode columns, wherein
a planar shape of each self-capacitive electrode on a surface provided with the plurality of self-capacitive electrodes is consisted of a body section and a plurality of projections extending from a first side of the body section;
the plurality of projections extend along a first direction and sequentially arranged along a second direction, and the second direction is intercrossed with the first direction;
on the surface provided with the plurality of self-capacitive electrodes, a recessed portion is encircled by every two projections and the body section of each self-capacitive electrode; and in the recessed portion is provided with one of a plurality of projections of another self-capacitive electrode; and
the plurality of projections are respectively a first projection, a second projection and a third projection, which are sequentially provided along the second direction;

on the surface provided with the plurality of self-capacitive electrodes, a first recessed portion is encircled by the first projection, the second projection and the body section; and a second recessed portion is encircled by the second projection, the third projection and the body section.

20. The touch substrate according to claim 19, wherein at least part of the second projection of the each self-capacitive electrode overlaps, in the second direction, a body section of a self-capacitive electrode that is adjacent with the each self-capacitive electrode.

* * * * *